(12) United States Patent
Jin et al.

(10) Patent No.: US 8,488,419 B1  
(45) Date of Patent: Jul. 16, 2013

(54) HYBRID PLASMON GENERATOR STRUCTURE AND PROCESS

(75) Inventors: Xuhui Jin, San Jose, CA (US);
Yoshitaka Sasaki, Santa Clara, CA (US); Hiroyuki Ito, Sunnyvale, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 13/548,301

(22) Filed: Jul. 13, 2012

(51) Int. Cl.
*G11B 11/00* (2006.01)

(52) U.S. Cl.
USPC ............. 369/13.32; 369/13.33; 369/13.13; 360/59

(58) Field of Classification Search
None
See application file for complete search history.

(56) References Cited

U.S. PATENT DOCUMENTS

| | | | |
|---|---|---|---|
| 8,036,069 B1 | 10/2011 | Jin et al. | |
| 8,107,325 B2 * | 1/2012 | Komura et al. | 369/13.33 |
| 8,179,628 B2 | 5/2012 | Zhou et al. | |
| 8,295,132 B2 * | 10/2012 | Jin et al. | 369/13.32 |
| 2008/0192376 A1 | 8/2008 | Tanaka et al. | |
| 2010/0315735 A1 | 12/2010 | Zhou et al. | |
| 2013/0016592 A1 * | 1/2013 | Tomikawa et al. | 369/13.22 |

OTHER PUBLICATIONS

Co-Pending U.S. Appl. No. 13/316,989, filed Dec. 12, 2011, "Planar Plasmon Generator with a Scalable Feature for TAMR," by Xuhui Jin et al., 35 pgs.
Co-Pending U.S. Appl. No. 13/283,064, filed Oct. 27, 2011, "Plasmon Generator Including Two Portions Made of Different Metals," by Yoshitaka Sasaki, et al., 81 pgs.

* cited by examiner

*Primary Examiner* — Muhammad N Edun
(74) *Attorney, Agent, or Firm* — Saile Ackerman LLC; Stephen B. Ackerman

(57) ABSTRACT

A TAMR head is disclosed with a hybrid plasmon generator (hPG) formed between a waveguide and write pole at an ABS. The hPG has a planar bottom surface facing the waveguide and is comprised of a first non-noble metal layer with a peg portion adjoining the ABS. The peg tip has a thickness in a down track direction and a width in a cross track direction that may be reduced to about 10 nm to shrink the size of the optical spot that provides localized heating to a track and facilitates the write process. A second metal layer made of a noble metal is formed on and alongside the first metal layer and is recessed from the ABS to expose the peg, and has a top surface adjoining the write pole that may have side and top heat sinks.

30 Claims, 5 Drawing Sheets

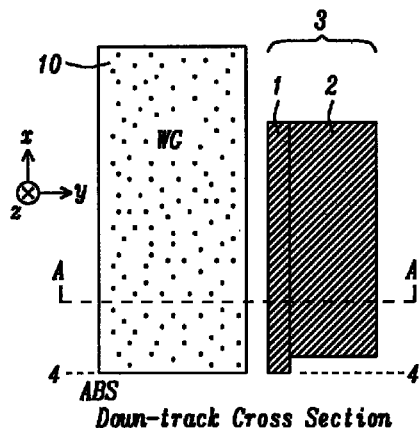
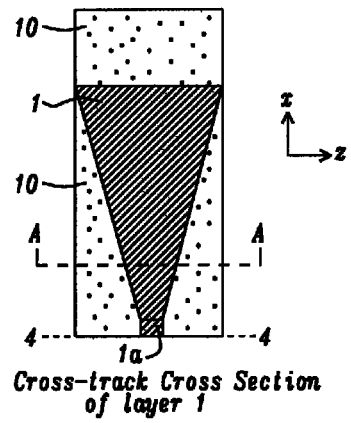
FIG. 1a — Down-track Cross Section
FIG. 1b — Cross-track Cross Section of layer 1
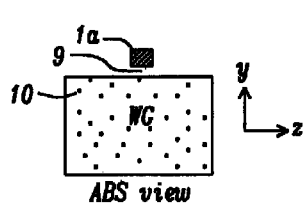
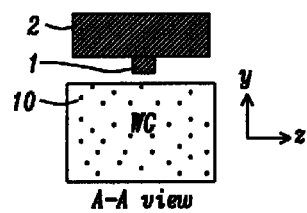
FIG. 1c — ABS view
FIG. 1d — A-A view
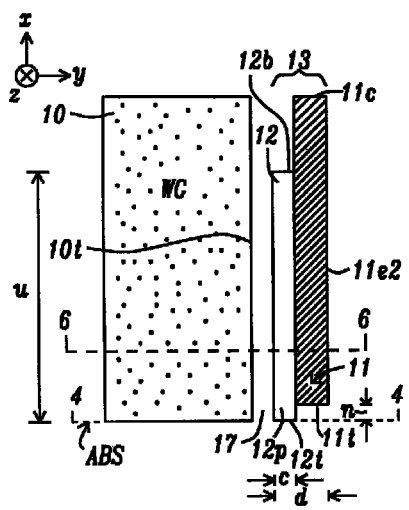
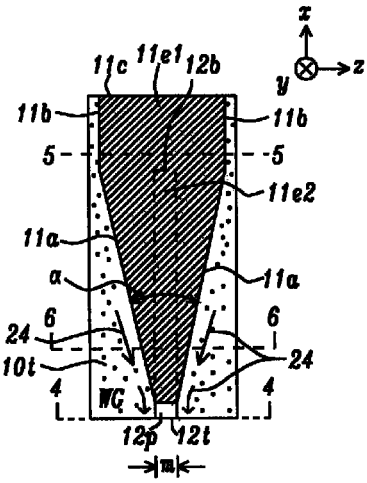
FIG. 2a
FIG. 2b

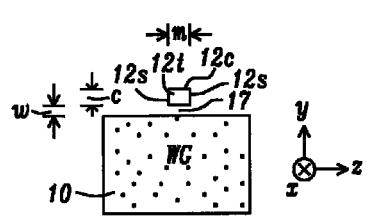
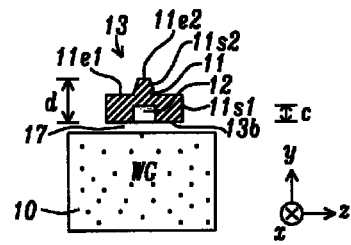
FIG. 3a  FIG. 3b
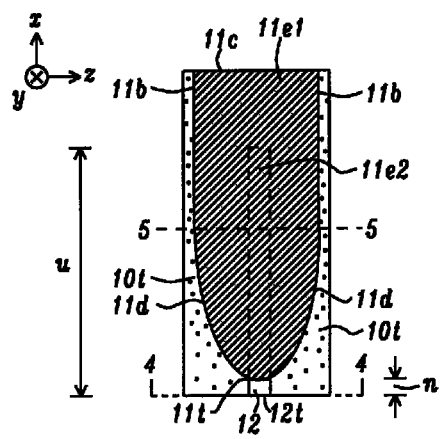
FIG. 4
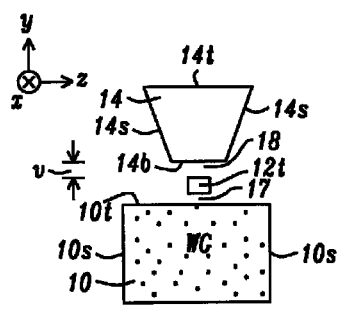
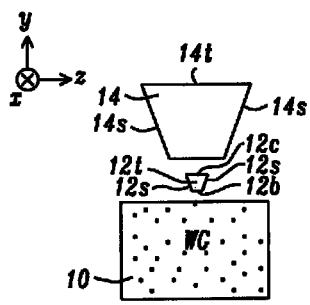
FIG. 5  FIG. 6

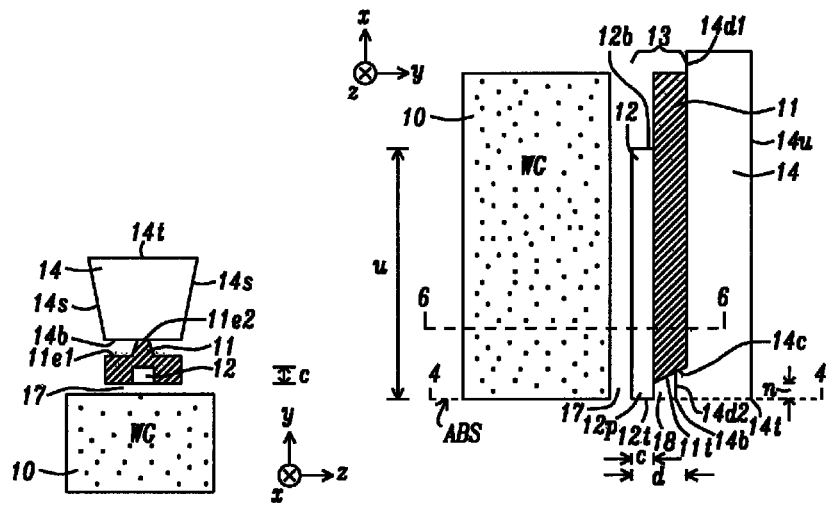
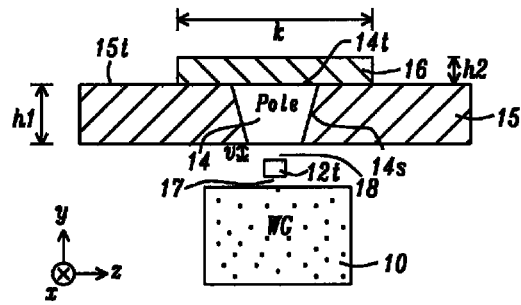
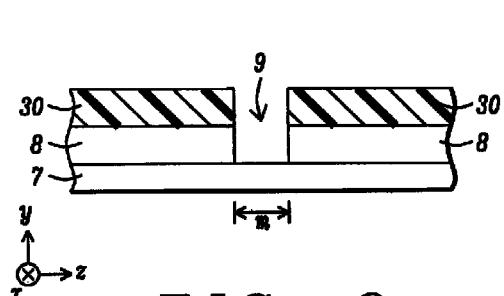 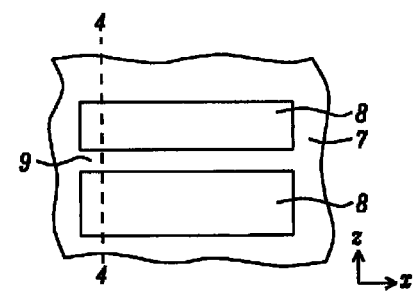

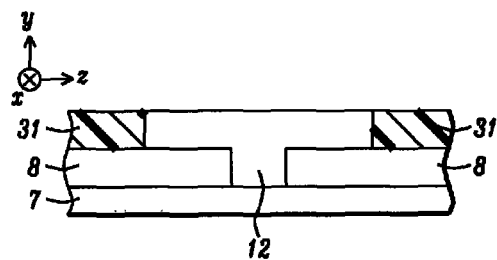
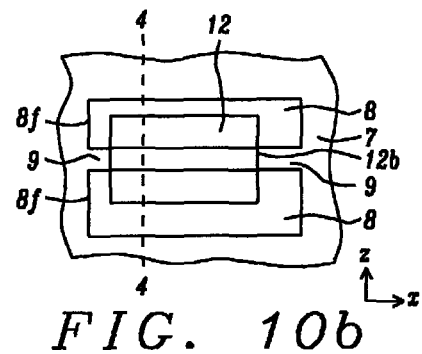
FIG. 10a  FIG. 10b
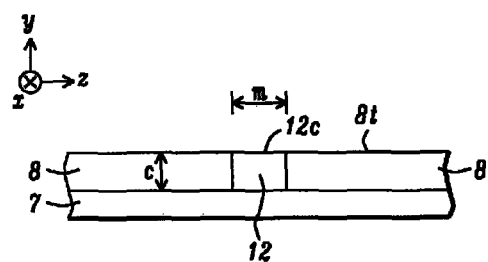
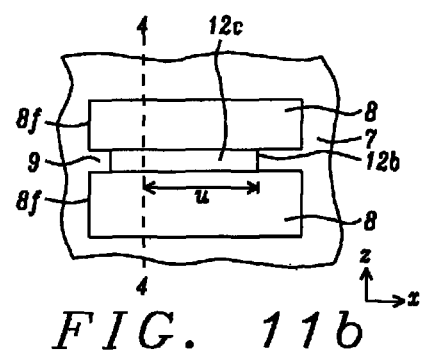
FIG. 11a  FIG. 11b
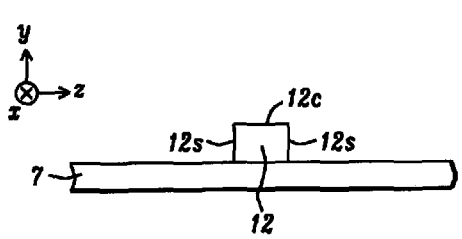
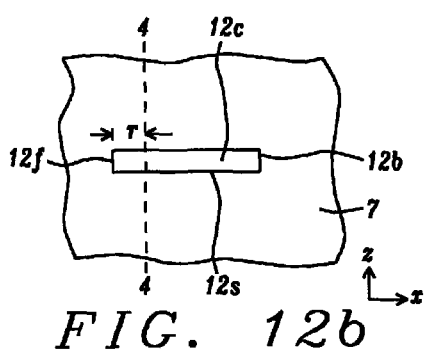
FIG. 12a  FIG. 12b

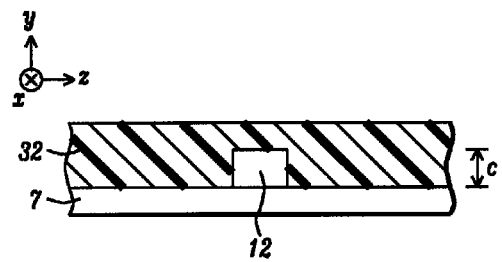
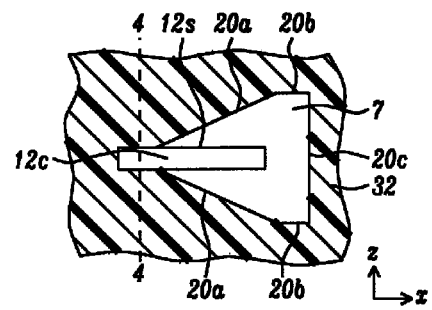
FIG. 13a    FIG. 13b
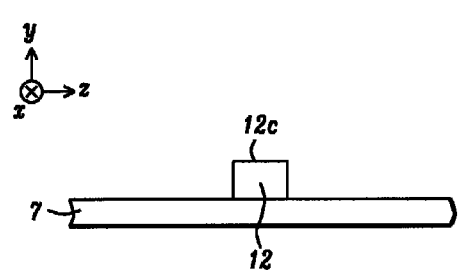
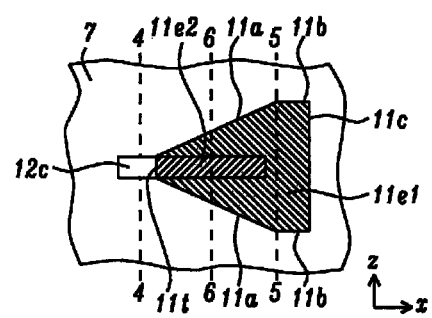
FIG. 14a    FIG. 14b
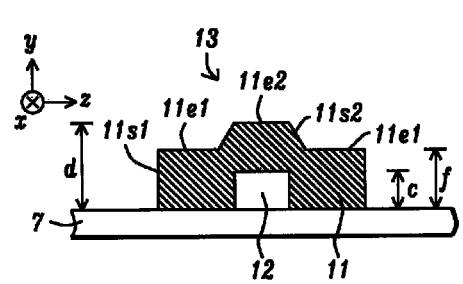
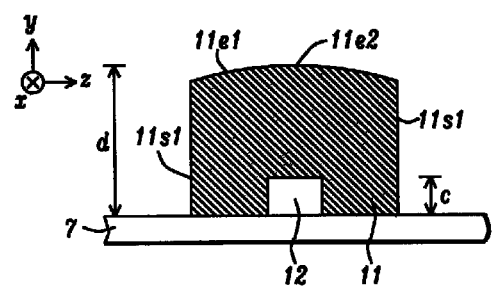
FIG. 14c    FIG. 14d

HYBRID PLASMON GENERATOR STRUCTURE AND PROCESS

RELATED PATENT APPLICATION

This application is related to the following: Ser. No. 13/316,989, filing date Dec. 12, 2011; and U.S. Pat. No. 8,036,069, both assigned to a common assignee and herein incorporated by reference in their entirety.

TECHNICAL FIELD

The present disclosure relates to magnetic read/write heads based on thermally assisted magnetic recording (TAMR) and in particular to a structure in which a plasmon generator (PG) couples a light optical mode from a waveguide to the propagating plasmon mode of the PG and the resulting plasmon energy is projected to a spot on the media where localized heating occurs to facilitate a write process.

BACKGROUND

TAMR is expected to be one of the future generations of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in alignment with a high magnetic field gradient, data storage density can be further improved with respect to current state of the art recording technology.

In addition to the components of conventional write heads, a TAMR head also typically includes an optical waveguide (WG) and a plasmon antenna (PA) or plasmon generator (PG). The waveguide serves as an intermediate path to guide the external laser light to the PA or PG where the light optical mode couples to the local plasmon mode of the PA or to the propagating plasmon mode of the PG. After the optical energy is transformed to plasmon energy, either with local plasmon excitation in the PA or with energy transmission along the PG, it is concentrated at the medium location where heating is desired. Ideally, the heating spot is correctly aligned with the magnetic field from the write head to realize optimum TAMR performance.

However, in the prior art, alignment has been difficult to achieve and the spot size is typically around 100 nm or greater which is significantly larger than the <50 nm size needed to make the first generation of TAMR devices with high optical efficiency.

Current technology encompasses a TAMR head structure that integrates an edge plasmon generator (EPG) with a triangular shape from a cross-sectional view. The shape edge of the triangular EPG is placed in the vicinity of an optical waveguide and supports a very confined edge plasmon mode. Through evanescent coupling, the optical energy in the WG can be efficiently transferred to EPG mode. The EPG transmits the plasmon energy toward the air bearing surface (ABS) and focuses the energy at a spot on the medium located underneath the EPG. The local confinement of the edge plasmon mode is determined by the angle that forms the shape edge of the EPG, the radius of the triangle corner, the noble metal composition of the EPG, and the dielectric material surrounding the tip. For a 25 nm tip radius, optical spot size in the medium is about 100 nm in full-width half maximum. By using a plasmon shield formed proximate to the EPG tip at the ABS as described in related U.S. Pat. No. 8,036,069, the optical spot on the medium can be further reduced. Optical spot size with a plasmon shield is related to the gap distance between EPG and plasmon shield and can be reduced to 50 nm with a gap distance less than 40 nm, for example. While the optical spot size may be reduced to a range of 20-30 nm with a 10 nm gap distance, the optical efficiency is significantly lowered which requires a higher laser power. However, higher laser power is not desirable for various reasons including reliability concerns.

Current technology does not provide a TAMR structure with a PG that allows for a narrow optical spot size of around 20 nm or less without requiring a high laser power, and where the PG can be fabricated with a good tolerance necessary for a high yielding manufacturing process. Furthermore, a plasmon generator is needed to enable scalable spot size to support areal density growth with good reliability.

SUMMARY

One objective of the present disclosure is to minimize the optical spot size produced in a magnetic medium by a plasmon generator (PG) to about 20 nm with a design that is scalable to near 10 nm spot size to enable extendibility to greater areal density.

A second objective of the present disclosure is to provide a PG design according to the first objective that has good reliability and can be fabricated with excellent process control.

These objectives are realized in various embodiments of the present disclosure wherein a TAMR write head structure includes a write pole that has a plasmon generator (PG) formed proximate to a leading edge of a pole tip region along the ABS. The plasmon generator extends a certain distance along a surface of the write pole towards the back end of the device. There is also an optical waveguide that is formed on an opposite side of the PG with respect to the write pole wherein the waveguide extends from the ABS in a lengthwise direction perpendicular to the ABS and parallel to a side of the plasmon generator. The waveguide captures light from a light source near the back end of the device and propagates the light toward the ABS. A portion of the light energy is transferred to the plasmon mode along the PG by evanescent coupling and is then propagated to the ABS through a metal rod portion in the PG before being projected onto a magnetic medium for spot heating during a write process.

A key feature of the present disclosure is the composition and shape of the plasmon generator. According to one embodiment, the plasmon generator has a hybrid (hPG) structure comprised of a rod made of a first metal that has an end portion called a peg at the ABS. The rod extends in a lengthwise direction perpendicular to the ABS and a bottom side is separated from the waveguide by a first gap distance. A top side of the rod is a second gap distance from a leading edge of the write pole at the ABS. The first metal is selected from Ru, Cr, Pd, Pt, Ti, W, Ta, Fe, Co, Ni, or alloys thereof for low atom mobility, high thermal stability, good mechanical hardness, and good adhesion to surrounding dielectric layers. The bulk of the hPG structure is comprised of a second metal layer that is preferably Au, Cu, Ag, or an alloy thereof for good optical efficiency. The second metal layer is recessed from the ABS by 5 to 150 nm and has a front triangular or parabolic shaped section from a top-down view and a back rectangular shaped section having two sides formed perpendicular to the ABS and extending beyond an end of the first metal layer. The second metal layer has a greater width in a cross-track direction and a greater thickness in a down-track direction than the first metal rod shaped layer. The first metal layer has a rectangular shape from a top-down view and a square, rectangular, or trapezoidal shape from an ABS view. From a cross-sectional view of the hPG along a plane that is parallel to the ABS, a bottom surface of the hPG facing the waveguide is formed along a plane that includes a bottom surface of the first metal rod shaped layer, and a bottom surface of the second metal layer on each side of the first metal layer. The hPG has a first thickness through a center region that includes a top section of the second metal layer formed above the first metal layer. Side sections of the second metal layer that adjoin the sides of the first metal layer preferably have a second thickness which is less than the first thickness.

The bottom surface of the hPG including the two bottom edges of the first metal layer adjoining the second metal layer along the bottom surface couples optical energy from the waveguide into surface plasmon (SP) through evanescent coupling. At the ABS, the SP mode is confined around the free standing peg that is surrounded by dielectric cladding and heats the media locally while the head flies over the media surface. Spot size of the SP mode on the media depends on the dimension of the peg, the spacing between the ABS and media recording layer, and thermal properties of the media layers. Optical spot size can be scaled down by reducing the cross-track and/or down-track dimensions of the peg at the ABS.

In another embodiment, the write pole is imbedded in side heat sinks made of a high thermal conductivity material that adjoins both sides of the write pole at the ABS. Moreover, there is a top heat sink formed on portions of the side heat sinks and on a trailing side of the write pole.

The present disclosure is also a method of fabricating a hybrid PG in a TAMR head. The manufacturing sequence comprises depositing a dielectric layer on a substrate and forming a trench feature therein in the shape of the first metal layer with conventional photoresist patterning and etching steps. Thereafter, the first metal layer is deposited on the dielectric layer to fill the trench. Next, a chemical mechanical polish (CMP) process is performed to make a top side of the first metal rod coplanar with a top surface of the dielectric layer. After the dielectric layer is removed, the second metal layer is deposited on the first metal layer with a pattern that is defined by an opening in a photoresist layer. Finally, the photoresist layer is stripped to leave the hPG structure.

BRIEF DESCRIPTION OF THE DRAWINGS

FIGS. 1a-1d are different views of a plasmon generator structure with a stack of two layers previously fabricated by the inventors.

FIG. 2a shows a cross-sectional view of a hybrid plasmon generator (hPG) formed proximate to a waveguide according to a first embodiment of the present disclosure and FIG. 2b is a top-down view of the structure in FIG. 2a.

FIG. 3a is an ABS view of the tip of the hPG in FIG. 2a and FIG. 3b is a view from a plane that parallel to the ABS and recessed from the ABS by about 100 nm.

FIG. 4 is a top-down view of a hPG according to a second embodiment of the present disclosure wherein the two front sides of the second metal hPG layer are formed with a curvature and connect to sides that are perpendicular to the ABS.

FIG. 5 is an ABS view showing the tip of the hPG that has vertical sidewalls and is positioned between a surface of a waveguide and a leading edge of a write pole layer in a TAMR structure according to a first or second embodiment of the present disclosure.

FIG. 6 is an ABS view showing the tip of the hPG that has sloped sidewalls and is positioned between a surface of a waveguide and a leading edge of a write pole layer in a TAMR structure according to another embodiment of the present disclosure.

FIG. 7a is a cross-sectional view of the hPG in FIG. 6 from a plane that is parallel to the ABS and intersects both of the first and second metal layers in the hPG.

FIG. 7b is a cross-sectional view along a down-track direction of the TAMR structure in FIG. 6.

FIG. 8 is an ABS view of the TAMR structure in FIG. 4 further comprised of a top heat sink and side heat sinks according to an embodiment described herein.

FIGS. 9a and 9b are a cross-sectional view and top-down view, respectively, in a first step of fabricating a hPG structure wherein an opening is formed in a dielectric layer on a substrate and has the shape of the first hPG metal layer.

FIGS. 10a and 10b are a cross-sectional view and top-down view, respectively, after a first metal layer is deposited on the dielectric layer in FIGS. 9a, 9b and fills the opening therein.

FIGS. 11a and 11b are a cross-sectional view and top-down view, respectively, after a chemical mechanical polish process is performed to planarize the first metal layer.

FIGS. 12a and 12b are a cross-sectional view and top-down view, respectively, after the dielectric layer is removed from the partially formed hPG in FIGS. 11a and 11b.

FIGS. 13a and 13b are a cross-sectional view and top-down view, respectively, after an opening in the desired shape of the second metal hPG layer is formed in a photoresist layer formed on and adjacent to the first metal hPG layer.

FIG. 14a shows an ABS view of the final hybrid EPG structure according to an embodiment of the present disclosure while FIG. 14b shows a top-down view, and FIGS. 14c, 14d depict a cross-sectional view along a plane that is parallel to the ABS and recessed about 100 nm from the ABS for different hPG thicknesses.

DETAILED DESCRIPTION

The present disclosure is a hybrid plasmon generator (hPG) with two metal layers that is advantageously used in a TAMR write head so that light energy generated by a light source and captured by a waveguide is coupled to a surface plasmon mode on the hPG and subsequently projected onto the magnetic media. An end of a first metal hPG layer with a rod shape has an end portion called a peg that abuts the ABS. The peg confines a narrow diameter portion of the near field of the surface plasmon mode on the recording medium during a thermally assisted write process. Peg dimensions may be reduced to narrow the spot size on the media and provide scalability to higher areal density devices. The terms surface and side may be used interchangeably when referring to a TAMR component such as a waveguide or hPG. A top surface of a TAMR component is defined as one that is facing a main pole layer. The TAMR write head may be part of a merged read head/write head design as appreciated by those skilled in the art.

Referring to FIGS. 1a-1d, various views are provided of a plasmon generator that was previously disclosed by the inventors in related patent application Ser. No. 13/316,989 where the optical spot size on the recording medium (not shown) is reduced by shrinking the physical size of a metal peg 1a located at the end of a first metal layer 1 at the ABS 4-4. As shown by the down-track cross-section in FIG. 1a where the y-axis represents the down-track direction, the z-axis is the cross-track direction, and the x-axis extends in a direction perpendicular to the ABS towards a back end of the device, the PG 3 consists of two layers 1, 2 made of the same noble metal or alloy. A first layer 1 has a bottom side facing the waveguide 10 while the second layer 2 is formed on a top side of the first layer and faces the write pole (not shown). Thus, the small peg feature 1a in the cross track cross-sectional view in FIG. 1b and in the ABS view of FIG. 1c is excited by a substantially larger portion of PG 3 that includes layers 1, 2 and is recessed from the ABS.

FIG. 1d is a cross-sectional view along the plane A-A in FIG. 1a and shows an embodiment where the bottom layer 1 has a rod shape that is substantially smaller in volume than top layer 2. Although Au, Ag, or Cu are proposed for the composition of layer 1 and peg 1a, it is known that Ag and Cu have a corrosion issue when exposed to the air at the ABS while Au experiences a migration issue at temperatures well below its melting point. As a result, the PG 3 made entirely of noble metals showed inadequate reliability during recording tests. The inventors have considered an alternative structure wherein the peg is replaced by a more robust metal. However, the design where only the peg portion of PG 3 is replaced by a more robust metal is very challenging to manufacture. Moreover, the interface between a lower layer 1 made of a noble metal, and a peg 1a constructed with a different metal may lead to a discontinuity issue and thereby degrade the plasmon generator performance.

Herein we disclose additional improvements in our plasmon generator design that relate to reducing the optical spot size projected onto the magnetic medium without compromising performance or reliability. In particular, various embodiments are described of a hybrid plasmon generator (hPG) wherein a first metal layer having a rod shape including a peg or tip at the ABS is made of a robust (non-noble) metal. The rod shaped first metal layer except for the peg portion is imbedded in a second layer of substantially greater volume that is comprised of a noble metal. The width of the second metal layer in a cross-track direction becomes greater as the distance from the ABS increases until reaching a maximum width in a back end section. From a top-down view, the second metal layer has a triangular shape or a parabolic shape with a front side or tip that is recessed about 5 to 150 nm from the ABS.

Referring to FIG. 2a, a first embodiment of the present disclosure is depicted from a down-track cross-sectional view and includes a waveguide 10 that abuts the ABS 4-4 and has a lengthwise dimension in an x-axis direction. The waveguide has a top surface 10t that is separated from a bottom surface of first metal layer 12 in hPG 13 by a gap 17 typically made of a dielectric material. First metal layer has a thickness c in a down-track direction (along the y-axis) while the second metal layer 11 in hPG 13 adjoins the top surface and two sides of the first metal layer. Total thickness of hPG is d in a down-track direction where d>c. Preferably, the d/c thickness ratio is from 2:1 to 5:1 where c and d are both measured along a line that is perpendicular to top surface 10t and passes through the center of the first metal layer and second metal layer top surface 11e2. The first metal layer is preferably comprised of Ru, Cr, Pd, Pt, Ti, W, Ta, Fe, Co, Ni, or alloys thereof to provide low atom mobility, good thermal robustness and mechanical hardness, and superior resistance to corrosion. Second metal layer 11 is made of Au, Cu, Ag, or alloys thereof for excellent optical efficiency. The peg 12p or end section of first metal layer 12 is the portion of the bottom layer not covered by second metal layer 11 and the peg terminates at tip 12t at the ABS. First metal layer 12 has one short side (tip) 12t at the ABS and a second short side 12b formed at a distance u of 0.2 to 2 microns from the ABS in an x-axis direction or perpendicular to the ABS. In the exemplary embodiment, both second metal layer 11 and waveguide 10 extend beyond the end 12b of the first metal layer in an x-axis direction. Second metal layer has a back end 11c, and a front end 11t that is recessed from the ABS 4-4 by a distance n of 5 to 150 nm which is the lengthwise dimension of peg 12p.

With regard to the top-down view in FIG. 2b, first metal layer 12 has a rod-like appearance with a rectangular shape and a width m in a cross-track direction along the z-axis. Current technology enables c and m dimensions as small as about 20 nm but the present design is expected to be scalable to at least 10 nm for c and m as technology improves and smaller images are fabricated with photoresist patterning and etching steps as explained in a later section. Although the waveguide is shown having a greater width in the cross-track direction than a back end 11c of the hPG, the present disclosure also anticipates an alternative embodiment wherein the second metal layer 11 of hPG 13 has a larger cross-track width than that of waveguide 10. A portion of second metal layer top surface 11e2 is formed above the first metal layer 12, but the bulk of the top surface 11e1 is not above the first metal layer. Two sides 11b of the second metal layer extend from the back end toward the ABS at essentially 90 degree angles and each side 11b connects with a straight side 11a that in turn connects to the front end. The vertex angle α formed by the two sides 11a varies from about 10° to 60° and depends on the lengthwise dimension of second metal layer 11. A back end section has a rectangular shape and is bounded by sides 11b and formed between plane 5-5 and the back end 11c.

A front end section of the second metal layer that is bounded by straight sides 11a, plane 5-5, and the front end 11t has a substantially triangular shape to concentrate plasmon energy (surface plasmon mode) at the peg 12p and tip 12t at the ABS. Plasmon energy 24 is propagated along the bottom surface of hPG 13 (not shown) and along sides 11b and 11a toward the ABS and finally along the sides of peg 12p before reaching the ABS 4-4. Rather than sides 11a converging to a single point as in a typical triangular shape, the front end 11t has a finite width such that sides 11a have a minimum width of separation m in a cross-track direction at a recessed distance n from the ABS. In an alternative embodiment, the plane 5-5 where the front end section joins the back end section in second metal layer 11 may intersect the first metal layer 12 instead of being formed a distance greater than u from the ABS as depicted in FIG. 2b.

Referring to FIG. 3a, a cross-sectional view of the tip 12t in FIG. 2b is shown from an ABS perspective. According to one embodiment, tip 12t has a square shape with two parallel sides 12s aligned in a down-track direction, a top surface 12c, and a bottom surface that is located a gap distance w of around 5 to 50 nm from a top surface of waveguide 10. The gap 17 is comprised a dielectric material with a low refractive index such as alumina, silicon oxide, silicon oxynitride (SiON), or MgF$_2$ to optimize the transmission of the surface plasmon (SP) mode. The peg portion 12p including tip 12t at the ABS has a width m and a thickness c. In another embodiment, tip 12t may have a rectangular shape where m>c or c>m.

In FIG. 3b, a cross-sectional view is shown of hPG 13 along the plane 6-6 in FIG. 2b. The hPG 13 has a planar bottom surface 13b including a bottom surface of first metal layer 12 and a bottom surface of second metal layer 11 facing a top surface of the waveguide 10. Plasmon energy (not shown) is propagated along bottom surface 13b and sides 11s1 toward the ABS. Second (top) metal layer 11 has two portions having a top surface 11e1 and sidewalls 11s1 that adjoin sides 12s of the first metal layer 12. Besides being an excellent optical transmission material, the second metal layer serves to suppress all but the fundamental SP mode propagating along the bottom surface 13b and converging on the peg 12p at the ABS. There is also a third portion of the top metal layer having a top surface 11e2 and sidewalls 11s2 that is formed above a top side of first metal layer 12. The maximum thickness d of the hPG 13 is from bottom surface 13b to top surface 11e2 above metal layer 12. Note that sidewalls 11s2 are only evident in conditions where the d/c thickness ratio is near 2:1. When the d/c thickness ratio increases to around 3:1 to 5:1, then the top sides 11e1, 11e2 form a continuous curved top surface as depicted in FIG. 14d. The SP mode is propagated along hPG 13 to the ABS where it is confined around the peg 12p and side 12t and is projected onto the media to heat the media locally while the head flies over the media surface (not shown). The optical spot on the media can be scaled down by reducing one or both of thickness c and width m. Confinement of optical energy in the media depends on the dimensions and composition of peg 12p, the spacing between side 12t and the media recording layer (not shown), and the properties of the media.

Since most of the plasmon energy is propagated along sides 11s1 and bottom surface 13b, the overall optical efficiency of the hPG 13 will be only slightly lower than a similar PG structure depicted in FIGS. 1a-1d where the rod-like layer 1 and top layer 2 are both made of a noble metal. However, the overall head reliability will be greatly improved because the peg is not made of a noble metal thereby avoiding the issue of metal migration (Au) or corrosion (Cu or Ag) due to exposure of a noble metal at the ABS. Furthermore, the first metal layer with a rod shape extends at least a few hundred nm from the ABS which means the bottom metal layer will be easier to fabricate than one considered earlier where only a peg portion of the lower metal layer is replaced by a non-noble metal.

According to a second embodiment of the present disclosure illustrated in FIG. 4, all the elements of the first embodiment are retained except for the front section of the second metal layer wherein straight sides 11a are replaced by two sides 11d having a curvature. As a result, the substantially triangular shape of the front section in the previous embodiment is replaced by a parabolic shaped front section wherein sides 11d converge to a tip 11t that is recessed from the ABS by a distance n of 5 to 150 nm. Therefore, the width in a cross-track direction (along the z-axis) of the front section of second metal layer 12 becomes increasingly greater as the distance from the ABS increases to a plane 5-5 where the front section adjoins a rectangular shaped back section bounded by sides 11b and back end 11c. Optionally, curved sides 11d may extend to a length greater than u from the ABS such that the plane 5-5 where the front section joins the back section of second metal layer 11 does not intersect the rod-like first metal layer 12.

Referring to FIG. 5, an ABS view of an embodiment is shown of a TAMR write head wherein hPG 13 as previously described has a peg portion with an end side also referred to as a tip 12t having a width m and a thickness c. The tip 12t is formed between a top surface 10t of the waveguide and a leading edge 14b of write pole 14. Top and bottom surfaces of the first metal layer are formed parallel to a top surface 10t of the waveguide and a leading side of the write pole. In one aspect, the write pole has a trapezoidal shape at the ABS with a leading edge 14b having a smaller cross-sectional width than that of a trailing edge 14t. In this case, the leading side of the write pole includes leading edge 14b and extends perpendicular to the ABS toward a back end of the TAMR device. Sidewalls 14s connect top and bottom surfaces of the write pole. The trailing edge is part of the trailing side of the write pole. The TAMR head including hPG 13, waveguide 10, and write pole 14 move in a down-track direction over a magnetic medium during a write process. The bottom surface (leading side) of the write pole including leading edge 14b is separated from the tip 12t by a gap 18 made of a dielectric material and having a thickness v in a down-track direction.

In an alternative embodiment depicted in FIG. 6, the structure of write pole 14 and waveguide 10 are retained from the previous embodiment but the rod-like first metal layer 12 in hPG 13 has a trapezoidal shape instead of a square or rectangular shape and extends from a back end to the front end tip 12t. In one aspect, the first metal layer has a top surface 12c which has a greater cross-track width along the z-axis direction than that of a bottom surface 12b. Sidewalls 12s are sloped and connect top and bottom surfaces. In both embodiments shown in FIGS. 5 and 6, the top surface of peg 12p including tip 12t preferably has a smaller width than the width of leading edge 14b in the write pole, and the sidewalls 10s of the waveguide are aligned in a y-axis (down-track) direction. Furthermore, as the thickness of the tip 12t is decreased, the gap distance between the tip and write pole 14 is preferably reduced to maintain a good alignment of the magnetic field from the write pole and optical spot from the peg on the magnetic medium. Optionally, tip 12t may have an inverted trapezoidal shape where the top surface 12c has a smaller cross-track width than that of the bottom surface 12b.

Referring to FIG. 7a, the TAMR write head depicted in FIG. 6 is shown from a plane that is parallel to the ABS and intersects both layers in hPG 13. According to a preferred embodiment, top surface 11e2 formed above first metal layer 12 contacts a portion of the leading side in write pole 14 including leading edge 14b. Although the close proximity of first metal layer 12 (and peg 12p) to write pole 14 is preferred for better alignment of the optical heating spot to the magnetic track written to on the magnetic medium, a consequence of direct contact of hPG 13 to leading edge 14b and leading side 14d1, 14d2 (FIG. 7b) is heating of write pole 14.

With regard to FIG. 7b, a down-track cross-sectional view of the TAMR structure in FIG. 6 is illustrated. In this embodiment, the front tip 11t of the second metal layer has a taper. The intersection of tip 11t with first metal layer 12 is a distance n from the ABS as in a previous embodiment. However, the recessed distance of a point on tip 11t becomes greater with increasing distance from first metal layer 12. Note that the write pole may have an uneven leading surface (side) comprised of a section 14d1 that interfaces with a top surface of the second metal layer 12, and a front section 14d2 that adjoins a top surface of the gap layer 18 at the ABS. Write pole surfaces 14d1, 14d2 are joined by a sloped section 14c which coincides with a portion of tip 11t. There is a trailing side 14u formed perpendicular to the ABS. In an alternative embodiment, the tip 11t may be formed parallel to the ABS as depicted in FIG. 2a.

In FIG. 8, a heat sink structure is illustrated to compensate for write pole heating caused by contact of the write pole with hPG 13. The cross-sectional view is shown from the ABS where only tip 12t of the hPG is visible. According to one embodiment, there is a side heat sink 15 adjoining both write pole sides 14s and a top heat sink 16 contacting the entire trailing side of the write pole proximate to the ABS including trailing edge 14t. Side heat sinks 15 may have a thickness h1 equivalent to that of the write pole 14 and have a top surface 15t that is coplanar with trailing side 14u (FIG. 7b). Top heat sink has a cross-track width k greater than the track width of the write pole and a thickness h2 that is generally less than h1. A substantial portion of a bottom side of top heat sink 16 may contact the top surface 15*t*. The gap distance v between tip 12*t* and write pole 14 in gap 18 is from 5 to 80 nm. As the tip 12*t* dimensions are scaled to smaller values, the gap distance v is preferably decreased as well to maintain optimal heating on the track being written to on the magnetic medium. The heat sinks 15, 16 may extend 200 to 1000 nm from the ABS towards the back end of the device and are preferably made of a high thermal conductivity material such as Au, Cu, Cr, Ti, Ta, Ru, Pt, Pd, and SiC.

The present disclosure is also a method of fabricating a hPG structure according to a series of steps depicted in FIGS. 9*a*-14*d*. Referring to FIG. 9*a*, a first step in the process sequende involves depositing a dielectric layer 8 on a substrate 7 made of AlTiC, for example. A first photoresist layer 30 is formed on the dielectric layer and is patterned by a conventional lithography process to form an opening 9 therein that is transferred through the underlying dielectric layer by a reactive ion etch (RIE) step. The RIE step generates the opening 9 in the dielectric layer and thereby uncovers a portion of substrate 7. The opening 9 has a cross-track dimension m.

In FIG. 9*b*, a top-down view is shown of the partially formed hPG in FIG. 9*a* following the removal of the first photoresist layer 30. The trench opening 9 has a lengthwise dimension along the x-axis direction. The eventual location of ABS 4-4 will be formed by a subsequent lapping process that is performed after the entire TAMR structure including hPG and write pole is fabricated. Note that the ABS will be aligned in a cross-track direction and perpendicular to the lengthwise dimension of trench opening 9.

Referring to FIG. 10*a*, a cross-sectional view of the structure in FIG. 9*b* is shown following a process wherein a second photoresist layer 31 is coated on dielectric layer 8 and is patterned by a lithography process to generate a second opening above opening 9. The first opening 9 in the dielectric layer and second opening in the photoresist layer 31 are filled with the first metal layer 12 by an ion beam deposition (IBD) process, for example. Thereafter, the second photoresist layer may be stripped by a standard method.

In FIG. 10*b*, a top-down view of the partially formed hPG in FIG. 10*a* is depicted after the second photoresist layer is removed. The back end 12*b* of the first metal layer is aligned parallel to the plane of the eventual ABS. A section of opening 9 near the front end 8*f* of the dielectric layer and behind the back end of first metal layer 12 may remain in place following the first metal deposition step. However, a substantial portion of the trench opening 9 is filled with the first metal layer 12 including a region through which the ABS will be formed in a subsequent step.

Referring to FIG. 11*a*, a cross-sectional view of the structure in FIG. 10*b* is depicted following a chemical mechanical polish (CMP) process that is performed to remove the portion of first metal layer above dielectric layer 8. As a result, a top surface 12*c* of first metal layer 12 is now coplanar with a top surface 8*t* of the dielectric layer 8, and thickness c and cross-track width dimension m are defined. From a top-down view in FIG. 11*b*, the rod like shape of the first metal layer 12 is apparent by its rectangular top surface 12*c*. During a subsequent lapping step, the final lengthwise dimension u between the ABS and back end 12*b* will be determined by placement of ABS 4-4.

Referring to FIG. 12*a*, the dielectric layer surrounding first metal layer is removed by a RIE process or the like to leave a free standing first metal layer 12 having sidewalls 12*s* and top surface 12*c*. The method of removing the dielectric layer 8 may comprise a treatment to clean the surface of substrate 7 with a cleaning solution commonly used following plasma etch steps. The top-down perspective in FIG. 12*b* shows a front end 12*f*, back end 12*b*, and sides 12*s* of the first metal layer. A portion of first metal layer 12 having a lengthwise dimension r along an x-axis direction between front end 12*f* and the eventual plane of ABS 4-4 will be removed during a later lapping process.

Referring to FIG. 13*a*, a third photoresist layer 32 is coated with a thickness preferably greater than c so that the third photoresist layer covers first metal layer 12. In a top-down view shown in FIG. 13*b*, the third photoresist layer 32 is patterned by a lithography process to form an opening that uncovers all of first metal layer except a front section where peg 12*p* will subsequently be formed. The opening is bounded in part by sides 20*a* that converge along sides 12*s* of the first metal layer. Each side 20*a* connects with a side 20*b* that extends perpendicular to the ABS and terminates at a back end side 20*c*. The opening uncovers a portion of substrate 7 and has a shape that defines the desired shapes and size of the triangular front section and rectangular back section of the second metal layer described previously.

Referring to FIG. 14*a*, the second metal layer is deposited by a plating technique, sputter deposition process, or the like. Thereafter, the second photoresist layer 32 is removed by a lift off process, for example. Second metal layer 11 remains only within the opening defined by sides 20*a*-20*c* in a previous step as shown in the top-down view in FIG. 14*b*. A small portion 11*e*2 of the second metal layer's top surface is formed over first metal layer 12 while a major portion 11*e*1 of the top surface does not cover the first metal layer. A triangular like front section of the second metal layer is bounded by front side 1it, sides 11*a*, and a plane 5-5 where the front section adjoins a back section of the second metal layer. The back section is bounded by sides 11*b*, back end 11*c*, and plane 5-5. The peg portion of the first metal layer 12 will be formed between ABS 4-4 and front side 1it in a subsequent lapping step and is not covered by the second metal layer. A back end portion of the first metal layer is covered by the second metal layer from front end 1it toward a back end 11*c*.

With regard to FIG. 14*c*, a cross-sectional view along the plane 6-6 in FIG. 14*b* is depicted for an embodiment where the d/c thickness ratio in hPG 13 is about 2:1. In this case, the second metal layer 11 is not thick enough to form a smooth top surface without topography. In other words, top surface 11*e*2 is sufficiently higher than top surface 11*e*1 having thickness f such that sidewalls 11*s*2 are evident between surfaces 11*e*1, 11*e*2. According to another embodiment shown in FIG. 14*d* where the d/c thickness ratio is in the range of about 3:1 to 5:1, the top surface comprising 11*e*1, 11*e*2 forms a continuous curved surface with no significant topography as seen from a vantage point along the plane 6-6 in FIG. 14*b*. Moreover, sidewalls 11*s*2 are aligned in a down-track direction in the exemplary embodiment. In either of the aforementioned embodiments, when the thickness c is adjusted downward to provide a smaller optical spot size, the thickness d may also be decreased to enable a smaller size v of gap 18 between tip 12*t* and write pole 14 shown in FIG. 8.

Thereafter, a second dielectric layer (not shown) may be deposited on the substrate to cover the hPG 13. A CMP process may be performed to planarize a top surface of the dielectric layer before a write pole is fabricated on the dielectric layer by a conventional process that is not described here. The second dielectric layer is the gap 18 between tip 12*t* and write pole 14 in FIG. 8. Once the remainder of the write head is completed, including side and top heat sinks adjoining the write pole in an alternative embodiment, a lapping process is performed to define an ABS. As mentioned earlier, the lapping process removes a front section of the peg 12p and forms a tip 12t of the hPG at the ABS.

The present disclosure has an advantage over the prior art in that it provides a hPG design with a unique combination of small tip at the ABS approaching 20 nm or less, and improved reliability because the peg exposed at the ABS is made of a robust metal and not a noble metal. Furthermore, the peg where the optical spot is confined at the ABS is part of a rod-like first metal layer of considerable length that can be manufactured with higher yield and tolerance than alternative designs where only the short peg portion of the first metal layer is made of a robust metal. The method of making the hPG comprises forming the lower metal layer with critical dimensions and a planar top surface before depositing the second metal layer. The overall sequence is compatible with existing magnetic head fabrication techniques. The disclosed hPG is convenient to integrate with a magnetic writer where the write pole can be placed closer to the optical spot to improve the magnetic/thermal gradient alignment on the magnetic medium.

While this disclosure has been particularly shown and described with reference to, the preferred embodiment thereof, it will be understood by those skilled in the art that various changes in form and details may be made without departing from the spirit and scope of this disclosure.

We claim:

1. A thermally assisted magnetic recording (TAMR) head comprising:
   (a) a write pole having a leading edge and a trailing edge formed along an air bearing surface (ABS), said leading edge and trailing edge are part of a leading side and trailing side, respectively, that are connected by two sides to define a cross-track width along each of the leading and trailing edges, the TAMR head including the write pole, a hybrid plasmon generator (hPG), and a waveguide move in a down-track direction over a magnetic medium during a write process;
   (b) the waveguide that captures light energy from a light source and propagates the light energy toward an end of the waveguide at the ABS, the waveguide has a top surface that faces the write pole and is separated from a planar bottom surface of the hPG by a first gap distance; and
   (c) the hPG that is formed between the waveguide and the write pole, the hPG couples light energy from the waveguide to a surface plasmon mode along the planar bottom surface, the surface plasmon mode is propagated to an end (tip) of a peg portion of the hPG at the ABS and is then projected as an optical spot onto a localized region of the magnetic medium thereby heating the localized region and reducing its magnetic coercivity and anisotropy to facilitate a write process, the hPG comprises:
      (1) a first metal layer made of a non-noble metal and with the end at the ABS and two parallel sides extending in a lengthwise direction a certain distance perpendicular to the ABS to a second end, and with a bottom surface and top surface formed parallel to the waveguide top surface and parallel to the write pole leading side, the first metal layer has a cross-track width and a first thickness in a down-track direction and includes a peg portion adjoining the ABS that is separated by a second gap distance from the leading edge of the write pole; and
      (2) a second metal layer made of a noble metal that covers the top surface and two parallel sides of the first metal layer except over the peg portion adjoining the ABS, the second metal layer has a bottom surface that together with the bottom surface of the first metal layer form the planar bottom surface of the hPG, a portion of a top surface of the second metal layer formed above the first metal layer adjoins the leading side of the write pole and is a greater distance from the planar bottom surface than a second portion of second metal layer top surface which is not formed above the first metal layer.

2. The TAMR head of claim 1 wherein the hPG tip at the ABS has a square, rectangular, or trapezoidal shape from an ABS view.

3. The TAMR head of claim 1 wherein the first gap distance is from about 5 to 50 nm, and the second gap distance is between about 5 and 80 nm.

4. The TAMR head of claim 1 wherein the first metal layer extends a distance of about 0.2 to 2 microns from the ABS to the second end.

5. The TAMR head of claim 1 further comprised of a side heat sink adjoining each side of the write pole, and a top heat sink contacting the trailing side of the write pole and a portion of a top surface of the two side heat sinks along the ABS.

6. The TAMR head of claim 1 wherein the cross-track width and down-track thickness of the first metal layer are reduced to about 10 nm to shrink a size of the optical spot on the magnetic medium.

7. The TAMR head of claim 6 wherein the second gap distance is reduced as the down-track thickness of the first metal layer is decreased.

8. The TAMR head of claim 1 wherein the hPG has a maximum thickness between the bottom surface of the first metal layer and a top surface of the second metal layer that contacts the write pole, and the ratio of the maximum thickness to the first thickness of the first metal layer is in a range from about 2:1 to 5:1.

9. The TAMR head of claim 1 wherein the peg portion of the first metal layer extends a distance of about 5 to 150 nm from the ABS.

10. The TAMR head of claim 1 wherein the first metal layer is comprised of Ru, Cr, Pd, Pt, Ti, W, Ta, Fe, Co, Ni, or alloys thereof, and the second metal layer is made of Au, Cu, Ag, or alloys thereof.

11. A hybrid plasmon generator (hPG) having a planar bottom surface formed on a substrate and facing a waveguide wherein the waveguide propagates light energy from a light source towards an air bearing surface (ABS) in a write head, and a portion of the light energy is coupled to a surface plasmon mode along sides and the planar bottom surface of the hPG, the surface plasmon mode is propagated to a hPG tip at the ABS and projected as an optical spot on a magnetic medium to provide localized heating during a write process, the hPG comprises:
   (a) a first metal layer made of a non-noble metal and with the end at the ABS and two parallel sides extending in a lengthwise direction a certain distance perpendicular to the ABS and terminating at a second end, and with a bottom surface and top surface formed parallel to the waveguide top surface and parallel to the write pole leading side, the first metal layer has a cross-track width and a first thickness in a down-track direction and includes a peg portion with the tip adjoining the ABS, the peg portion is separated by a first gap distance from the waveguide and by second gap distance from a leading edge of the write pole; and
   (b) a second metal layer made of a noble metal that covers the top surface and two parallel sides of the first metal layer except over the peg portion, the second metal layer has a bottom surface that together with the bottom surface of the first metal layer form the planar bottom surface of the hPG, a portion of a top surface of the second metal layer formed above the first metal layer adjoins the leading side of the write pole and is a greater distance from the planar bottom surface than a second portion of second metal layer top surface which is not formed above the first metal layer.

12. The hybrid plasmon generator of claim 11 wherein the second metal layer has a front section having a front end that is recessed from the ABS by about 5 to 150 nm, the front section has a substantially triangular shape from a top-down view with two sides that extend from the front end toward a back side of the hPG, and a distance between the two sides in a cross-track direction becomes greater with increasing distance from the ABS.

13. The hybrid plasmon generator of claim 11 wherein the second metal layer has a front section with a parabolic shape from a top-down view, the parabolic shape has two sides that converge at a tip which is recessed from the ABS by about 5 to 150 nm, and a distance between the two sides in a cross-track direction becomes greater with increasing distance from the ABS.

14. The hybrid plasmon generator of claim 11 wherein the hPG tip at the ABS has a square, rectangular, or trapezoidal shape from an ABS view.

15. The hybrid plasmon generator of claim 11 wherein the first gap distance is from about 5 to 50 nm, and the second gap distance is between about 5 and 80 nm.

16. The hybrid plasmon generator of claim 11 wherein the first metal layer extends a distance of about 0.2 to 2 microns from the ABS to the second end.

17. The hybrid plasmon generator of claim 11 wherein the first metal layer is comprised of Ru, Cr, Pd, Pt, Ti, W, Ta, Fe, Co, Ni, or alloys thereof, and the second metal layer is made of Au, Cu, Ag, or alloys thereof.

18. The plasmon generator of claim 11 wherein the cross-track width and down-track thickness of the first metal layer are reduced to about 10 nm to shrink a size of the optical spot on the magnetic medium.

19. The plasmon generator of claim 18 wherein the second gap distance is reduced as the down-track thickness of the first metal layer is decreased.

20. The plasmon generator of claim 11 wherein the hPG has a maximum thickness between the bottom surface of the first metal layer and the top surface of the second metal layer that contacts the write pole, and the ratio of the maximum thickness to the first thickness of the first metal layer is in a range from about 2:1 to 5:1.

21. The plasmon generator of claim 11 wherein the peg portion of the first metal layer extends a distance of about 5 to 150 nm from the ABS.

22. A method of fabricating a plasmon generator in a TAMR head, comprising:
(a) providing a dielectric layer on a substrate, and forming a trench in the dielectric layer wherein a lengthwise dimension of the trench is in a direction perpendicular to a plane that will subsequently become the air bearing surface (ABS), and the trench exposes a portion of the substrate;
(b) depositing a first metal layer made of a non-noble metal on the dielectric layer and exposed substrate to a level that fills the trench along a substantial portion thereof including a region that becomes the ABS in a subsequent step;
(c) performing a chemical mechanical polish (CMP) process to remove the first metal layer above the dielectric layer and form a top surface of the first metal layer that is coplanar with a top surface of the dielectric layer, a distance between the top surface of the first metal layer and the substrate is a thickness in a down-track direction, and a width of the first metal layer top surface is in a cross-track direction;
(d) removing the first dielectric layer by an etch technique to leave a first metal layer on the substrate, the first metal layer has a rectangular shape from a top-down view wherein two sides are connected to two ends, and the plane of the subsequently formed ABS intersects the two sides;
(e) forming a photoresist layer on the first metal layer and then patterning to form an opening in a shape of a subsequently deposited second metal layer, the opening exposes a portion of the substrate along the two sides and one end of the first metal layer and a substantial portion of the first metal layer except in a front peg portion that includes the second end in a region where the ABS will subsequently be formed;
(f) depositing a second metal layer made of a noble metal on the first metal layer and on the photoresist layer;
(g) removing the photoresist layer and second metal layer formed thereon to leave a front peg portion of first metal layer that is not covered by the second metal layer, and aback end portion of first metal layer that is covered by the second metal layer; and
(h) performing a lapping process to form an ABS and a tip of the front peg portion at the ABS.

23. The method of claim 22 wherein a top surface of the second metal layer formed above the first metal layer has a thickness that is about 2 to 5 times greater than the thickness of the first metal layer.

24. The method of claim 22 wherein the tip of the hybrid plasmon generator at the ABS has a square, rectangular, or trapezoidal shape from an ABS view.

25. The method of claim 22 wherein the first metal layer extends a distance of about 0.2 to 2 microns from the ABS to a back end.

26. The method of claim 22 wherein the first metal layer is comprised of Ru, Cr, Pd, Pt, Ti, W, Ta, Fe, Co, Ni, or alloys thereof, and the second metal layer is made of Au, Cu, Ag, or alloys thereof.

27. The method of claim 22 wherein the cross-track width and down-track thickness of the first metal layer may be reduced to about 10 nm.

28. The method of claim 22 wherein the front peg portion of the first metal layer extends a distance of about 5 to 150 nm from the ABS.

29. The method of claim 22 wherein the second metal layer has a front section having a front end that is recessed from the ABS by about 5 to 150 nm, the front section has a substantially triangular shape from a top-down view with two sides that extend from the front end toward a back side of the hybrid plasmon generator, and a distance between the two sides in a cross-track direction becomes greater with increasing distance from the ABS.

30. The method of claim 22 wherein the second metal layer has a front section with a parabolic shape from a top-down view, the parabolic shape has two sides that converge at a tip which is recessed from the ABS by about 5 to 150 nm, and a distance between the two sides in a cross-track direction becomes greater with increasing distance from the ABS.

* * * * *